Figure 1:
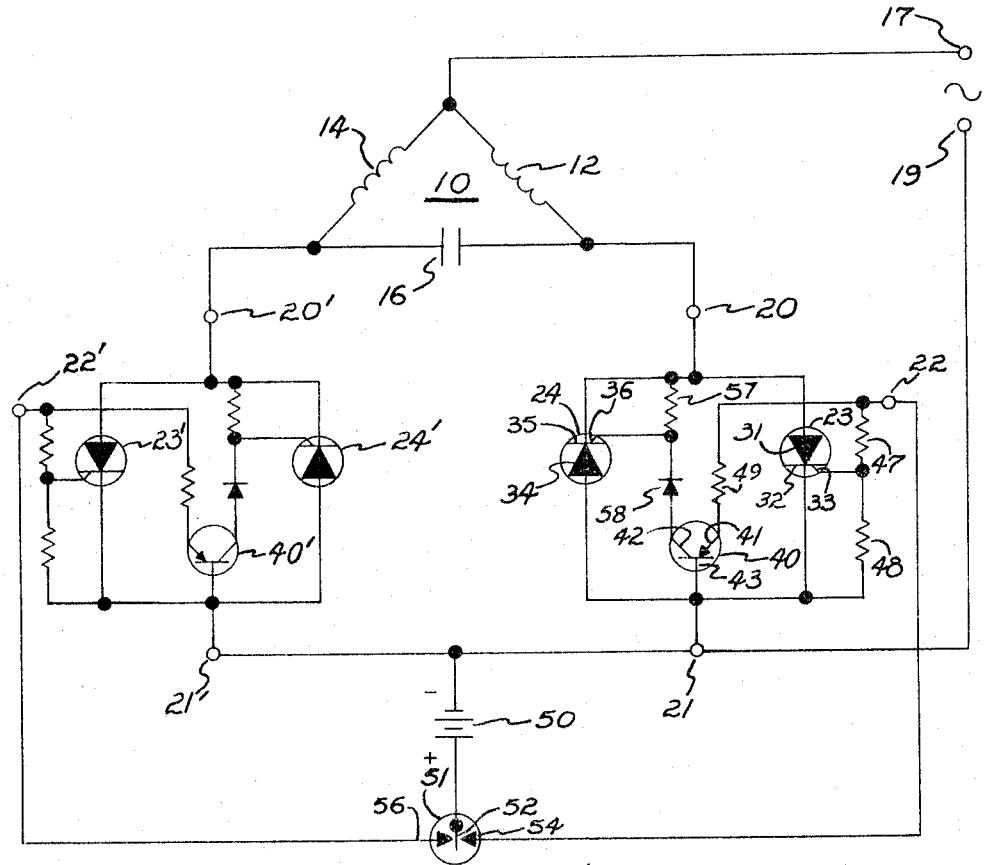

Aug. 23, 1966   B. H. PINCKAERS   3,268,742
ELECTRONIC SWITCH, HAVING ONE CONTROL INPUT, PROVIDING
BIDIRECTIONAL CURRENT CONTROL
Filed Sept. 11, 1964

INVENTOR.
BALTHASAR H. PINCKAERS
BY
Osmund R. Dahle
ATTORNEY

United States Patent Office 3,268,742
Patented August 23, 1966

3,268,742
ELECTRONIC SWITCH, HAVING ONE CONTROL INPUT, PROVIDING BIDIRECTIONAL CURRENT CONTROL
Balthasar H. Pinckaers, Edina, Minn., assignor to Honeywell Inc., a corporation of Delaware
Filed Sept. 11, 1964, Ser. No. 395,724
7 Claims. (Cl. 307—88.5)

This invention is concerned with a control circuit, and more particularly with an electronic switch which may use controlled rectifiers and transistors to provide a bidirectional current control having merely one control input.

Replacement of mechanical devices by electronic devices is known to offer a number of advantages, such as the elimination of contact bounce when a mechanical switch is replaced by an electronic switch. Those skilled in the art are well aware of the various advantages, and are also well aware that to gain these advantages there are numerous problems and new disadvantages to overcome. This invention offers a solution to problems that arise when one is attempting to create a bidirectional or A.C. electronic switch, which may be used in a single-pole-double-throw, center-off, configuration.

By way of example, assume a pair of parallel-inverse (back-to-back) connected controlled rectifiers to be used as a serial switch to connect a load to an A.C. source of energy. This basic circuit is now quite commonly used, and switching is often achieved by connecting the control electrode of each rectifier to means responsive to the alternating voltage of the A.C. source. This type of switch will do an adequate job of providing power to the load. But where a variety of loads are encountered, that is resistive, capacitive, or inductive, the efficiency of this type of switch is hampered.

To overcome this problem, this invention teaches the use of a source of control energy, not sensitive to the alternations of the A.C. source, capable of biasing on or priming the parallel-inverse connected rectifiers so that they stand ready to accept the changes in the direction of current flow or voltage whenever they occur no matter what type of load is being used. Further, the system of this invention accomplishes this purpose with the use of only a single control input, which fact lends itself well to the use of the circuit of this invention in more complex switches, such as single-pole-double throw A.C. switches.

It is therefore an object of this invention to provide an electronic bidirectional switch capable of more efficiently supplying power to any type of electrical load.

A further object of this invention is to provide an A.C. switch including a pair of parallel-inverse connected controlled current carrying devices, which devices require only a single control input to accomplish efficient bidirectional switching.

Figure 2:
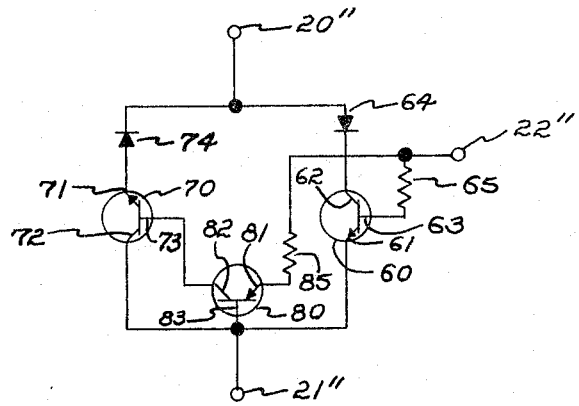

These and other objects of this invention will become apparent upon consideration of the accompanying claims, specification and drawings, of which:

FIGURE 1 is a schematic drawing of a SPDT switch, with center "OFF" position, for a reversible A.C. motor, which switch utilizes the circuit of this invention, and FIGURE 2 is a schematic drawing of an alternate embodiment of the circuit of this invention which could also be used in the SPDT switch of FIGURE 1.

The circuit of FIGURE 1 discloses a single-pole-double-throw switch for an A.C. reversible motor 10, which switch includes an embodiment of the invention connected to the circuit by terminals 20, 21 and 22. The embodiment comprises a pair of controlled rectifiers 23 and 24. SCR 23 has an anode 31, a cathode 32 and a gate 33. SCR 24 has an anode 34, a cathode 35 and a gate 36. Anode 31 and cathode 35 are both connected to terminal 20. Cathode 32 and anode 34 are both connected to terminal 21, to thus connect SCR's 23 and 24 in a parallel-inverse relation. There is also shown a current control device, here shown as PNP tranistor 40, having an input electrode or emitter 41, an output electrode or collector 42, and a control electrode or base 43. Base 43 is connected to terminal 21. Collector 42 is connected through a diode 58 to gate 36 of SCR 24. A resistor 57 is connected between gate 36 and terminal 20. Emitter 41 is connected by a resistor 49 to terminal 22. Terminal 22 is also connected through a resistor 47 to gate 33 of SCR 23. A resistor 48 is connected between gate 33 and terminal 21.

There is also shown a pair of A.C. input terminals 17 and 19, adapted to be connected to a bidirectional source of energy. Terminal 19 is connected to terminal 21. Terminal 17 is connected to one end of a winding 12 of motor 10, the other end of winding 12 is connected to terminal 20. Terminal 17 is also connected to one end of another winding 14 of motor 10, the other end of winding 14 is connected to terminal 20' and also to one end of a capacitor 16 of motor 10, the outer end of the capacitor 16 is connected to terminal 20. Connected within terminals 20', 21', and 22' are a pair of SCR's 23' and 24', and a PNP transistor 40', which are all connected exactly as are SCR's 23, 24, and transistor 40 with their associated components within terminals 20, 21 and 22, to thus form a duplicate of the embodiment.

There is also disclosed a source of control energy here shown as a battery 50. Battery 50 has one end, here shown as the negative terminal, connected to both of terminals 21 and 21'. The other end, of positive terminal, om battery 50 is connected to a center arm 52 of a single-pole-double-throw, center-off switch 51, here shown as a mechanical switch having a center arm 52 and a pair of contacts 54 and 56. It should be understood that switch 51 may well represent a simple electronic switching network not requiring high power electronic devices. Contact 54 of switch 51 is connected to terminal 22. Contact 56 of switch 51 is connected to terminal 22'.

FIGURE 2 discloses another embodiment of the circuit of this invention. Terminals 20", 21" and 22" are equivalent to terminals 20, 21 and 22 and are used to indicate where the embodiment would be substituted for the embodiment utilized in the circuit of FIGURE 1. In FIGURE 2 there is shown a pair of NPN transistors 60 and 70. Transistor 60 has an emitter 61, a collector 62 and a base 63. Transistor 70 has an emitter 71, a collector 72 and a base 73. Collector 62 is connected through a diode 64 to terminal 20". Emitter 71 is connected through a diode 74 to terminal 20". Emitter 61 is connected to terminal 21". Collector 72 is connected to terminal 21", such that transistors 60 and 70, in combination with diodes 64 and 74, are connected in parallel-inverse relation. There is also shown a transistor 80 here shown as a PNP transistor, having an emitter 81, a collector 82 and a base 83. Collector 82 is connected to base 73. Base 83 is connected to terminal 21". Emitter 81 is connected through a resistor 85 to terminal 22". Base 63 is connected through a resistor 65 to terminal 22".

The operation of the circuit of the invention will be understood by reference to FIGURE 1. Assume first that the alternating voltage on terminal 17 is about to make terminal 17 become positive with respect to terminal 19. It is desired to have a current flow through windings 12 and 14 of motor 10, which could be accomplished by turning on either SCR 23 or SCR 23'. If SCR 23' turns on, motor winding 14 is directly across the A.C. supply and winding 12 is in series with capacitor 16 across the A.C. supply. This results in clockwise rotation of motor 10. However, when SCR 23 turns on, winding 14 is in series with capacitor 16 and counter clockwise rotation is the result. Assume that arm 52 of switch 51 is in contact with contact 54 to thus place a positive bias on control terminal 22. This would cause a current flow from terminal 22 through resistors 47 and 48 to terminal 21 and back to the negative side of battery 50. The voltage drop across resistor 48 would in turn cause a gate current to flow from gate 33 to anode 32. Thus, SCR 23 would be biased on to provide current through windings 12 and 14 of motor 10.

Note that the positive bias on terminal 22 would also cause a current flow through resistor 49, emitter 41 of transistor 40, through base 43 of transistor 40 and back to the negative side of battery 50. This emitter to base current will serve to bias transistor 40 on, but it should be noted that there will be no collector current in common base connected transistor 40 until terminal 19 becomes positive with respect to terminal 17.

It is important to note that the battery 50 and the single-pole-double-throw switch 51 are merely representative of a source of control energy and a switching means, respectively, and that many well known power supply and electronic switching circuits could be used to serve in their place. The battery 50 and the switch 51 were chosen for clarity in the showing of the invention.

Should it be desired to reverse motor 10, it would only be necessary to switch arm 52 from contact 54 to contact 56. This would then place the control bias on terminal 22' and the SCR's 23' and 24' would then serve the functions of SCR's 23 and 24 as previously described. It should be noted that the use of common base connected transistors 40 and 40' allows control of each pair of SCR's from a single control input, which fact adds greatly to the inexpensiveness, reliability, and versatility of the system.

The circuit of FIGURE 2 is another embodiment of the invention which could be substituted directly into the system of FIGURE 1. In that case the control bias would appear on terminal 22" to bias on transistor 60 through resistor 65 and to cause a current flow from emitter 81 to base 83 in transistor 80. Thus, assuming terminal 17 to again be positive, there would be a current flow from terminal 20" through diode 64 from collector 62 to emitter 61 of transistor 60 and out to terminal 21". When the sine wave reversed, transistor 80 would be primed to pass a biasing current to base 73 of transistor 70, which would in turn allow a current flow from terminal 21" to collector 72 to emitter 71 of transistor 70, through diode 74 and out through terminal 20". This embodiment will be operative when the gain of transistors 60 and 70 is great enough to allow peak load current to flow.

The invention as above described can be seen to be a comparatively inexpensive and reliable means of providing sufficient power to any type of load through the use of a single control input for controlling a pair of parallel-inverse connected controlled current rectifying devices.

It will be obvious that the general principles herein disclosed may be embodied in forms other than those specifically illustrated without departing from the spirit of the invention as defined in the following claims.

What is claimed is:
1. A bidirectional switch comprising:
a pair of controlled, unidirectional current carrying devices connected in parallel-inverse relation;
first and second terminals adapted to be connected to a source of bidirectional energy;
a load;
means connecting said load and said pair of parallel-inverse connected current carrying devices serially between said first and second terminals;
a control terminal;
control energy means connected intermediate said first terminal and said control terminal;
means connecting said control terminal to a control electrode on one of said pair of current carrying devices;
and further means connecting said control terminal to a control electrode on the other of said pair of current carrying devices, said further means including a transistor having a base electrode connected to said first terminal.

2. A bidirectional switch comprising:
first and second switching devices each having input, output and control electrodes;
means connecting said first device input electrode to said second device output electrode and means connecting said first device output electrode to said second device input electrode, to thus connect the devices in a parallel-inverse circuit;
a source of energy;
load means;
means connecting said load means and said parallel-inverse circuit serially across said source of energy;
a source of control energy having first and second terminals;
means connecting said first terminal to said source of energy;
means connecting said second terminal to said first device control electrode;
a third device having input, output and control electrodes;
means connecting said third device output electrode to said second device control electrode;
means connecting said third device input electrode to said second terminal;
and means connecting said third device control electrode to said first terminal.

3. A bidirectional switch comprising:
a pair of terminals adapted to be connected across a source of energy;
a pair of controlled rectifier devices connected in parallel-inverse relation between said terminals;
a current control device having input, output and control electrodes;
means connecting said current control device output electrode to a control electrode on one of said controlled rectifier devices;
means connecting said current control device input electrode to a control electrode on the other of said controlled rectifier devices;
means connecting said current control device control electrode to one of said pair of terminals;
control energy means;
and means connecting said control energy means between said one of said pair of terminals and said current control device input electrode.

4. The bidirectional switch of claim 3, wherein the pair of controlled rectifier devices each comprises a serial combination of a transistor and a diode.

5. The bidirectional switch of claim 3, wherein the current control device is a common base connected transistor.

6. Semiconductor switch means comprising:
a pair of controlled rectifiers each including anode, cathode and gate electrodes;
means connecting said pair of controlled rectifiers in a parallel-inverse circuit;
a pair of terminals adapted to be connected to a source of energy;
means connecting said parallel-inverse circuit between said pair of terminals;
a control terminal adapted to be connected to a source of control energy;
impedance means connecting said control terminal to one of said gate electrodes;
a transistor having input, output and control electrodes;
means connecting said input electrode to said control terminal;

means connecting said control electrode to one of said pair of terminals;
and means connecting said output electrode to the other of said gate elctrodes.

7. Semiconductor switch means comprising:
first and second terminals adapted to be connected to a source of energy;
first and second transistors each having input, output and control electrodes;
first and second diodes;
means connecting said first diode between said first terminal and said first transistor input electrode;
means connecting said second diode between said first terminal and said second transistor output electrode;
means connecting said first transistor output electrode and said second transistor input electrode, respectively, to said second terminal;
a control terminal adapted to be connected to a source of control energy;
means connecting said second transistor control electrode to said control terminal;
a third transistor having input, output and control electrodes;
means connecting said third transistor input electrode to said control terminal;
means connecting said third transistor output electrode to said first transistor control electrode;
and means connecting said third transistor control electrode to said second terminal.

References Cited by the Examiner
UNITED STATES PATENTS

| | | | |
|---|---|---|---|
| 2,972,685 | 2/1961 | Baude | 307—88.5 |
| 3,031,588 | 4/1962 | Hilsenrath | 307—88.5 |
| 3,146,392 | 8/1964 | Sylvan | 307—88.5 |

ARTHUR GAUSS, *Primary Examiner.*

J. ZAZWORSKY, *Assistant Examiner.*